United States Patent [19]
Jordan

[11] Patent Number: 5,711,591
[45] Date of Patent: Jan. 27, 1998

[54] BOAT ALERTING SYSTEM

[76] Inventor: James Jordan, 9877 Simpson Ave., Quinton, Ala. 35130-8100

[21] Appl. No.: 720,049

[22] Filed: Sep. 27, 1996

[51] Int. Cl.⁶ ..................................................... B60Q 1/02
[52] U.S. Cl. ........................... 362/61; 362/83.3; 362/229
[58] Field of Search ................................. 362/265, 61, 80, 362/267, 431, 249, 252, 263, 83.3, 228, 229; 340/984

[56] References Cited

U.S. PATENT DOCUMENTS

| | | | |
|---|---|---|---|
| 2,850,621 | 9/1958 | Bateman et al. | 362/267 |
| 2,938,109 | 5/1960 | Coleman | 362/61 |
| 4,360,862 | 11/1982 | Strasser et al. | 362/80 |

*Primary Examiner*—Y My Quach

[57] ABSTRACT

A new Boat Alerting System for maximizing a boat's visibility to other boaters during darkness and inclement weather conditions. The inventive device includes a hollow aluminum shaft removably secured to a boat, a water proof electronics housing secured to the hollow aluminum shaft, a transparent light housing secured to the water proof electronics housing, and a lighting means secured within the transparent light housing.

3 Claims, 2 Drawing Sheets

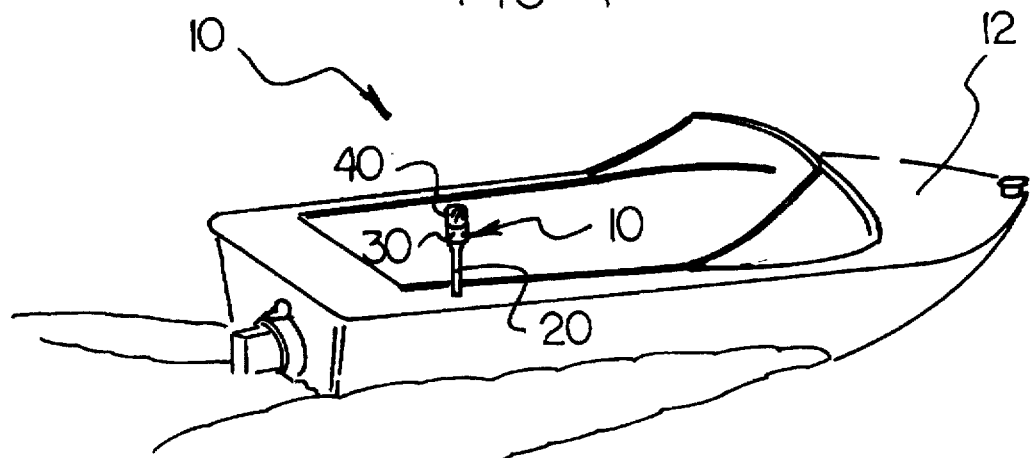
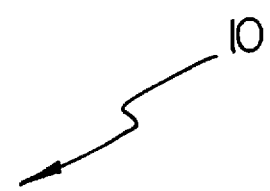
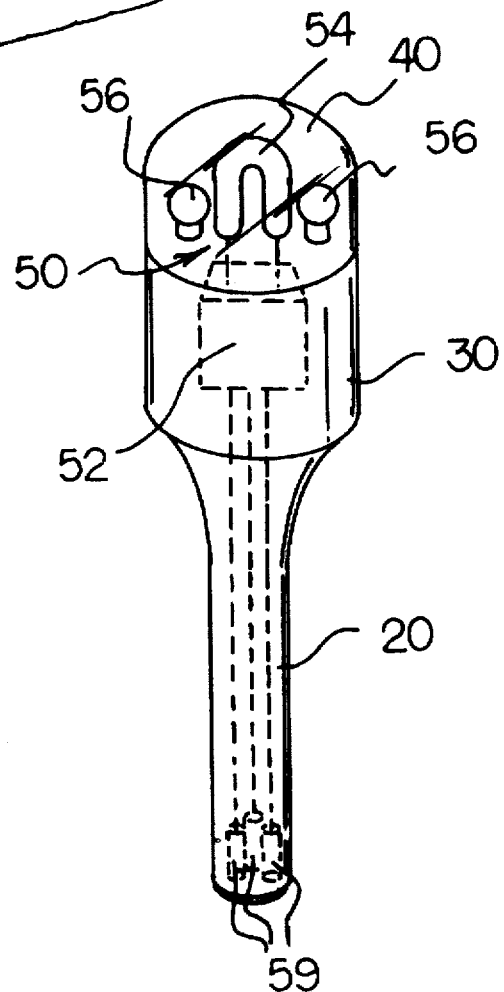

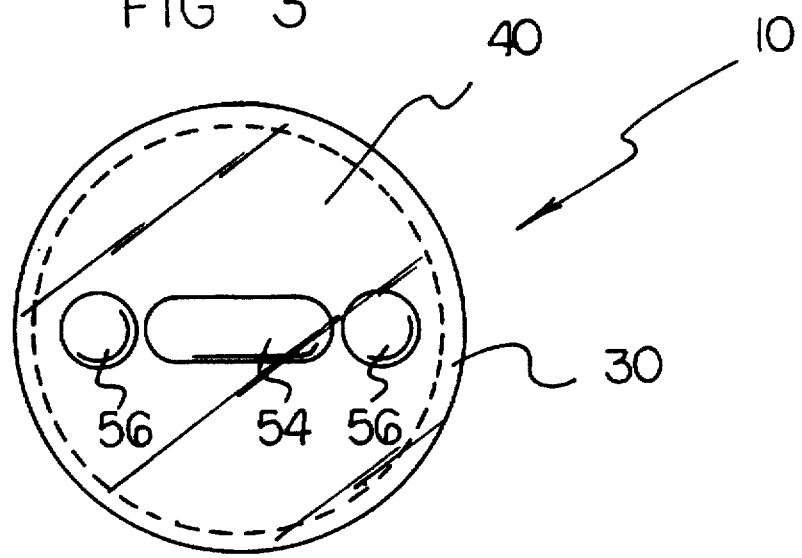
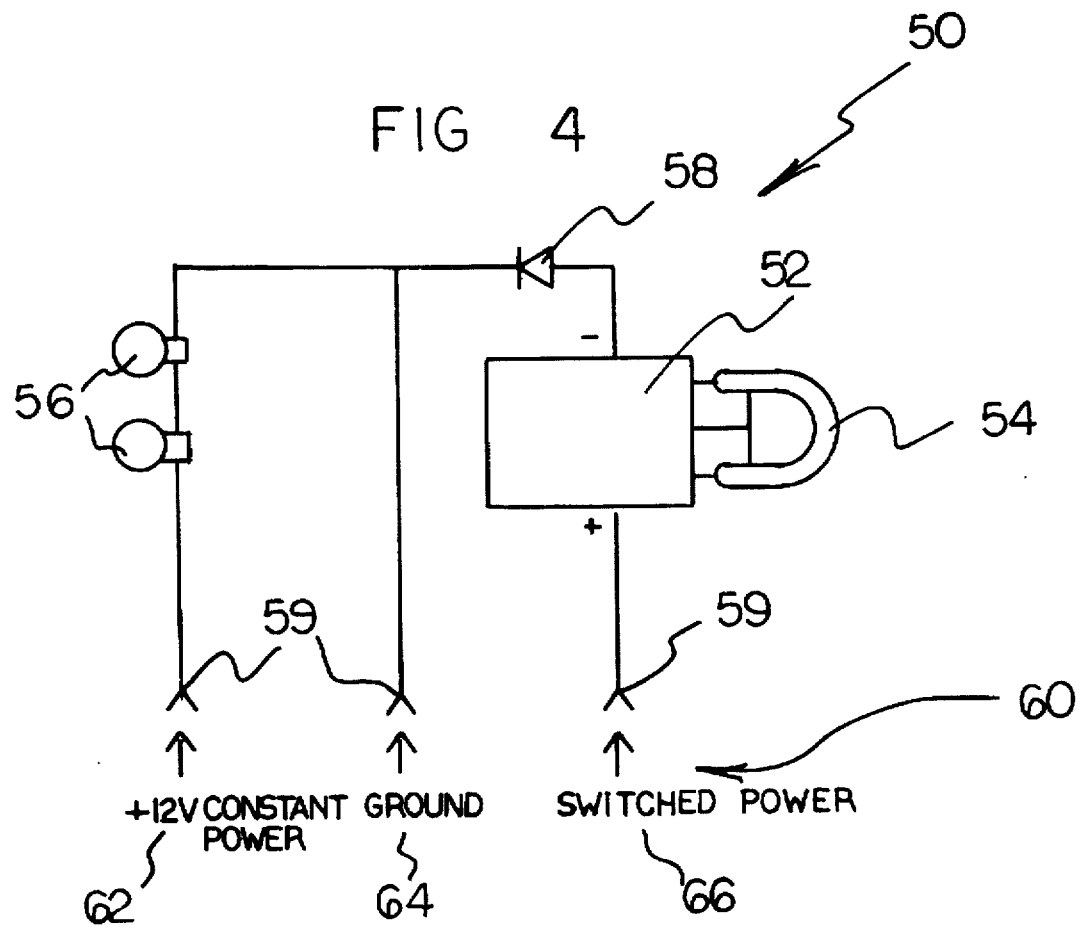

BOAT ALERTING SYSTEM

BACKGROUND OF THE INVENTION

1. Field of the Invention

The present invention relates to Lighting Devices and more particularly pertains to a new Boat Alerting System for maximizing a boat's visibility to other boaters during darkness and inclement weather conditions.

2. Description of the Prior Art

The use of Lighting Devices is known in the prior art. More specifically, Lighting Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Lighting Devices include U.S. Pat. No. 4,856,452; U.S. Pat. No. 5,416,670; U.S. Design Pat. No. 274,561; U.S. Pat. No. 5,321,591; U.S. Pat. No. 4,042,919 and U.S. Pat. No. 5,381,141.

While these devices fulfill their respective, particular objectives and requirements, the aforementioned patents do not disclose a new Boat Alerting System. The inventive device includes a hollow aluminum shaft removably secured to a boat, a water proof electronics housing secured to the hollow aluminum shaft, a transparent light housing secured to the water proof electronics housing, and a lighting means secured within the transparent light housing.

In these respects, the Boat Alerting System according to the present invention substantially departs from the conventional concepts and designs of the prior art, and in so doing provides an apparatus primarily developed for the purpose of maximizing a boat's visibility to other boaters during darkness and inclement weather conditions.

SUMMARY OF THE INVENTION

In view of the foregoing disadvantages inherent in the known types of Lighting Devices now present in the prior art, the present invention provides a new Boat Alerting System construction wherein the same can be utilized for maximizing a boat's visibility to other boaters during darkness and inclement weather conditions.

The general purpose of the present invention, which will be described subsequently in greater detail, is to provide a new Boat Alerting System apparatus and method which has many of the advantages of the Lighting Devices mentioned heretofore and many novel features that result in a new Boat Alerting System which is not anticipated, rendered obvious, suggested, or even implied by any of the prior art Lighting Devices, either alone or in any combination thereof.

To attain this, the present invention generally comprises a hollow aluminum shaft removably secured to a boat, a water proof electronics housing secured to the hollow aluminum shaft, a transparent light housing secured to the water proof electronics housing, and a lighting means secured within the transparent light housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Boat Alerting System apparatus and method which has many of the advantages of the Lighting Devices mentioned heretofore and many novel features that result in a new Boat Alerting System which is not anticipated, rendered obvious, suggested, or even implied by any of the prior art Lighting Devices, either alone or in any combination thereof.

It is another object of the present invention to provide a new Boat Alerting System which may be easily and efficiently manufactured and marketed.

It is a further object of the present invention to provide a new Boat Alerting System which is of a durable and reliable construction.

An even further object of the present invention is to provide a new Boat Alerting System which is susceptible of a low cost of manufacture with regard to both materials and labor, and which accordingly is then susceptible of low prices of sale to the consuming public, thereby making such Boat Alerting System economically available to the buying public.

Still yet another object of the present invention is to provide a new Boat Alerting System which provides in the apparatuses and methods of the prior art some of the advantages thereof, while simultaneously overcoming some of the disadvantages normally associated therewith.

Still another object of the present invention is to provide a new Boat Alerting System for maximizing a boat's visibility to other boaters during darkness and inclement weather conditions.

Yet another object of the present invention is to provide a new Boat Alerting System which includes a hollow aluminum shaft removably secured to a boat, a water proof electronics housing secured to the hollow aluminum shaft, a transparent light housing secured to the water proof electronics housing, and a lighting means secured within the transparent light housing.

Still yet another object of the present invention is to provide a new Boat Alerting System wherein the user's boat is uniquely identified so as to alert other boaters of the user's position.

Even still another object of the present invention is to provide a new Boat Alerting System that distinguishes the user's boat from shoreline lights.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side perspective view of a new Boat Alerting System mounted to a boat according to the present invention.

FIG. 2 is a side perspective view of the present invention disclosing the lighting means in relation to the transparent light housing.

FIG. 3 is a top view of the present invention.

FIG. 4 is a schematic diagram of the present invention's lighting means.

DESCRIPTION OF THE PREFERRED EMBODIMENT

With reference now to the drawings, and in particular to FIGS. 1 through 4 thereof, a new Boat Alerting System embodying the principles and concepts of the present invention and generally designated by the reference numeral 10 will be described.

More specifically, it will be noted that the Boat Alerting System 10 comprises a hollow aluminum shaft 20 removably secured to a boat, a waterproof electronics housing 30 secured to the end of the hollow aluminum shaft 20 opposite of the boat, a transparent light housing 40 secured to the waterproof electronics housing 30 opposite of the hollow aluminum shaft 20, and a lighting means 50 secured within the waterproof electronics housing 30 and the transparent light housing 40.

As best illustrated in FIGS. 1 through 6, it can be shown that a manual switch 66 is electronically connected to a constant twelve volt power source 62, and preferably constant power supplied from the electrical system 60 (such as the battery) of the boat on which the system 10 is installed. An electronic inverter 52 is electronically connected to a selectively switchable source of power from the boat's electrical power system 60, such as may be controlled by a manual switch 66 mounted on the boat, to supply power to the electronic inverter such that the electronic inverter 52 produces a pulsing electrical current. The electronic inverter 52 is electronically connected to diode 58 where the diode 58 is electronically connected to a ground 64 as best shown in FIG. 4 of the drawings. A xenon flash tube 54 is electronically connected to the electronic inverter 52 where the xenon flash tube 54 produces a strobe light. The xenon flash tube 54 is preferably centrally positioned within the transparent light housing 40. At least two incandescent bulbs 56 are electronically connected in series to the twelve volt power source 62 and the ground 64 as shown in FIG. 4 of the drawings. At least three female electrical connections 59 are electronically to the lighting means 50. The female electrical connections 59 are for electronically connecting to a boat's power source as best shown in FIG. 2 of the drawings. The female electrical connections 59 mate with corresponding unnumbered male electrical connections which are electronically connected to the boat's electrical power source 60. Preferably, the transparent light housing 40 is dome shaped as best shown in FIG. 2 of the drawings. The xenon flash tube 54 preferably flashes at two second intervals producing a strobe light effect.

In use, the user simply mounts the present invention to the boat 12 by sliding the female electrical connections 59 over the unnumbered male electrical connections. The user closes the manual switch 66 which activates the electronic inverter 52 which produces a pulsating electrical current to the xenon flash tube 54 thereby creating a strobe light effect. The incandescent bulbs 56 illuminate constantly during the use of the boat 12. The diode 58 connected to the electronic inverter 52 provides polarity reversal protection if not provided in the electronic inverter 52. When the user finishes utilizing the boat 12, the user opens the manual switch 66 thereby discontinuing the strobe light effect.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Boat Alerting System comprising:

a hollow aluminum shaft removably secured to a boat;

a waterproof electronics housing secured to an end of the hollow aluminum shaft opposite of the boat;

a transparent light housing secured to the waterproof electronics housing opposite of the hollow aluminum shaft;

a lighting means secured within the waterproof electronics housing and the transparent light housing;

at least three female electrical connections connected electronically to the lighting means, the female electrical connections mating with corresponding male electrical connections which are electronically connected to a boat's electrical system, wherein the lighting means includes:

an electronic inverter electronically connecting to a manually switched power source of the boat's electrical system, through a first one of the female electrical connections and corresponding male electrical connection wherein the electronic inverter produces a pulsating electrical current;

a diode electronically connected between the electronic inverter and a ground of the boat's electrical system through a second one of the female electrical connections and corresponding male electrical connection;

a xenon flash tube electronically connected to the electronic inverter for producing the strobing lights, said xenon flash tube being substantially centrally positioned within the transparent light housing;

at least two incandescent bulbs electronically connected in series with a constant power source of the boat's electrical system and the ground of the boat's electrical system through a third one of the female electrical connections and the second one of the female electrical connections and corresponding male electrical connections.

2. The Boat Alerting System of claim 1, wherein the transparent light housing is dome shaped.

3. The Boat Alerting System of claim 2, wherein the xenon flash tube flashes at two second intervals.

* * * * *